(No Model.) 2 Sheets—Sheet 1.
W. LOREY.
FILTER.
No. 529,558. Patented Nov. 20, 1894.
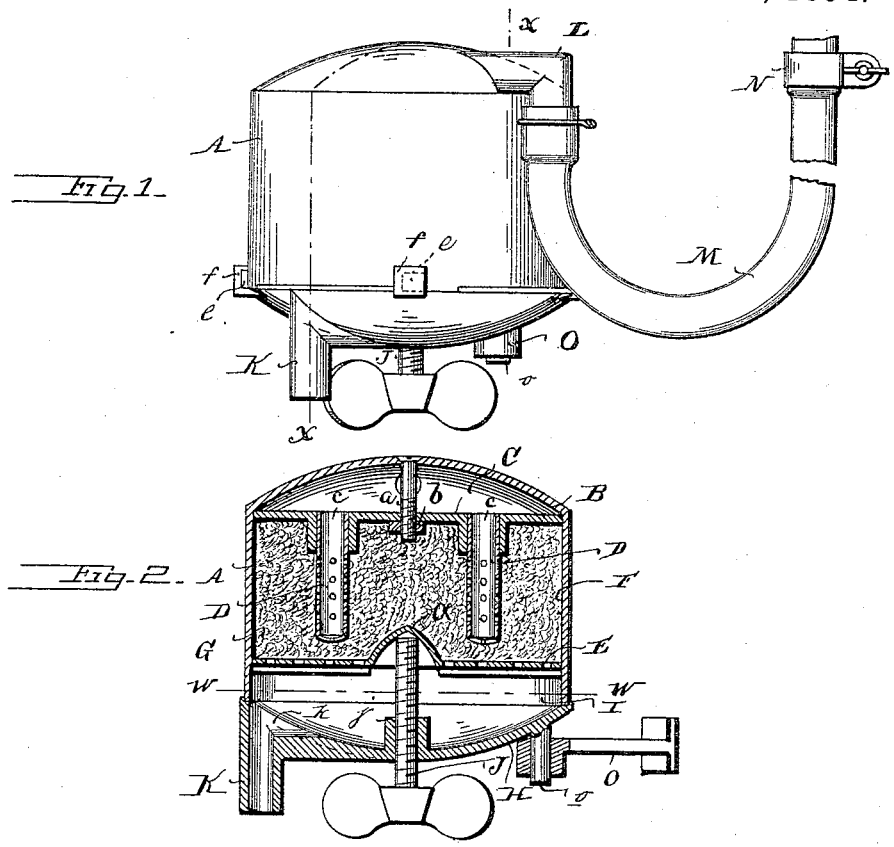
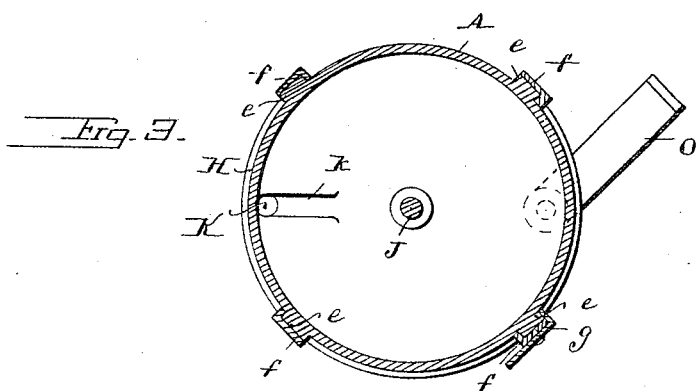
Witnesses:
Jesse B. Heller
Inventor.
William Lorey
By his attorney
Attorney.

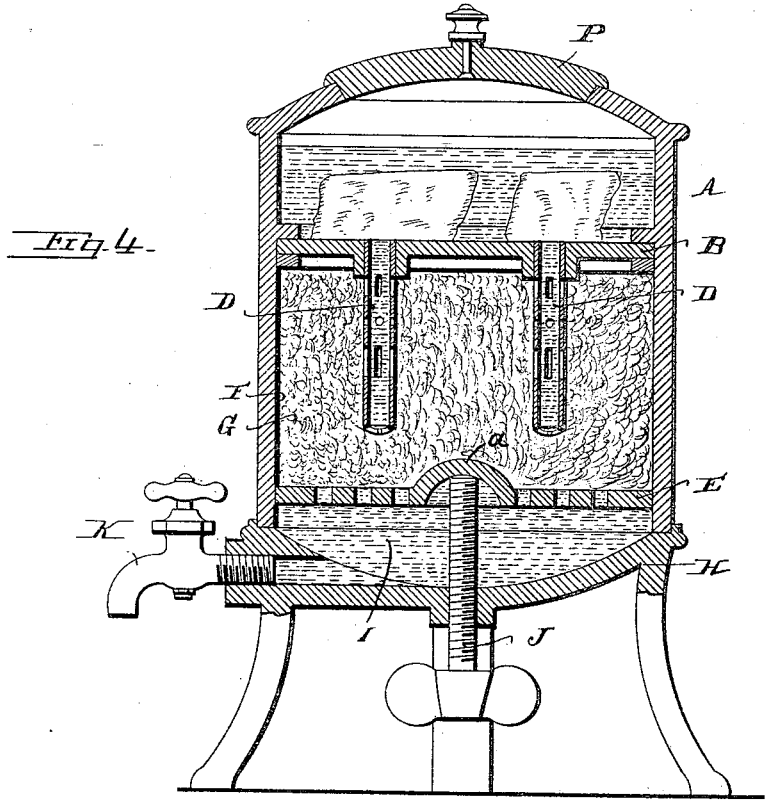

United States Patent Office.

WILLIAM LOREY, OF PHILADELPHIA, PENNSYLVANIA, ASSIGNOR TO JOHN BRAUN, WILLIAM P. M. BRAUN, AND JOHN F. BRAUN, OF SAME PLACE.

FILTER.

SPECIFICATION forming part of Letters Patent No. 529,558, dated November 20, 1894.

Application filed July 28, 1893. Serial No. 481,693. (No model.)

*To all whom it may concern:*

Be it known that I, WILLIAM LOREY, of the city and county of Philadelphia and State of Pennsylvania, have invented an Improvement in Filters, of which the following is a specification.

My invention relates to filters and consists of certain improvements which are fully set forth in the following specification and shown in the accompanying drawings which form a part thereof.

It is the object of my invention to provide a convenient and efficient apparatus for filtering water, &c. It is my object to accomplish an efficient filtration by compact and conveniently handled apparatus, which may be easily cleansed or repaired.

In carrying out my invention I force the water or liquid through a filtrant, preferably of fibrous material, which is compressed into an approximately hard, solid mass, so that the water, instead of percolating through a loosely packed filtrant, is forced to make its way through the compressed mass and is, therefore, more perfectly filtered. The water is preferably introduced through one or more perforated tubes into the body of this compact mass of filtering material, and is forced from such tubes under pressure, such as hydrant pressure, directly into the filtrant, which is tightly packed about the tubes. The filter is so constructed that the filtrant may be compressed or packed about the tubes between two plates which form a compartment to contain the filtrant, one of these plates being made adjustable so that pressure may be applied to it to compress the filtrant and pack it tightly. One form of my improved filter is especially adapted for attachment to a tap or spigot in a room of a building, so as to receive the water at the ordinary hydrant pressure. The water from the tap passes through the filter and emerges from an outlet therein. The filter is so constructed that it may be easily taken apart for repairs or for the purpose of cleansing it.

In the drawings, to which I shall now refer for the purpose of more particularly describing my invention, Figure 1 is a side elevation of my improved filter. Fig. 2 is a vertical sectional view of the same on the line $x$—$x$ of Fig. 1. Fig. 1 is a horizontal sectional view on the line $w$—$w$ of Fig. 2; and Fig. 4 is a vertical sectional view of my improved filter illustrating a slight modification in the construction.

A is the hollow case of the filter, which may be constructed of any suitable material.

B is a diaphragm within the hollow case A located at a distance below the top so as to form the upper compartment C. For convenience of construction I have shown the top of the case A curved or dome shaped to form a suitable compartment C above the diaphragm B. The diaphragm B may be supported within the case A in any convenient manner, as by the bolt $a$ and nut $b$. With this construction the diaphragm may be easily removed for purposes of cleaning or making repairs. The diaphragm B is provided with one or more apertures $c$, to which are fitted perforated tubes D projecting a distance down from the diaphragm B within the body of the case A. The perforations in the tubes D may be in the form of small holes or narrow slits, or both forms may be employed.

E is a perforated plate located within the case A below the tubes D, and forming a central compartment F between the diaphragm B and plate E. This compartment is filled with a filtrant G, preferably of fibrous material, which is packed tightly about the tubes D. The plate E is movable so that it may be forced upon the packing of filtering material G to thoroughly compress it and pack it tightly about the tubes. Any suitable filtering material may be employed, but I prefer a filtrant of fibrous material such as cotton pulp.

H is a lower cap or plate which is attached to the bottom of the case A a distance below the perforated plate E, forming the lower compartment I below the plate E. This cap H is preferably conical or dome shaped so as to form a more or less countersunk or recessed bottom in the compartment I.

It is immaterial to my invention how the cap or bottom plate H is secured to the body or case A. In the drawings I have shown the body A provided with lugs $e$ and the cap with cleats *f* which are adapted to fit over the lugs *e*. The cleats *f* are made solid and closed at the rear *g*, so as to arrest the cap when it has been turned sufficiently to bring the cleats in proper position over the lugs.

*h* is a catch pivoted to one of the cleats and adapted to be turned over the open end of the cleat to lock it to the lug. This is merely one form of fastening that may be employed for securing the cap to the case or body A. The cap may be screwed upon the body, or attached in any other convenient manner.

For the purpose of forcing the perforated plate E upon the packing of filtering material any convenient device may be employed. In the drawings I have shown for this purpose a set screw J extending through a threaded hole or hub *j* in the cap H, and bearing upon the plate E within a recess *a* so that the plate may be forced upon the packing of filtering material by screwing up the set screw J. Instead of a single set screw J bearing upon the center of the plate as shown, a number of set screws may be employed bearing upon different portions of the plate, or any other convenient means may be employed for forcing the plate E upon the filtrant G. The recess *a* forms upon the upper face of the plate E a central boss or protuberance which acts upon the filtrant when the plate E is tightened to press it outward toward the sides and thus packs it more tightly about the tubes D.

K is an outlet from the lower compartment I, preferably leading from the recessed bottom thereof, as through a groove *k*. The water or liquid to be filtered is supplied to the top compartment C, which may be provided with a suitable opening for that purpose.

In the construction shown in Figs. 1, 2, and 3, I have shown the filter constructed to receive the water from a tap, and for this purpose the top of the case A is provided with an inlet L opening into the compartment C. M is a tube or hose connected with the inlet L and adapted for attachment to a tap as by the clamp N. In this construction the filter is adapted to be supported upon a bracket O which receives a pin or lug *o* on the filter. The bracket O may be attached to the wall adjacent to the tap or spigot.

In the construction shown in Fig. 4, the filter is shown constructed as a stationary filter, such as may be employed as a water cooler. The upper compartment C is provided with the usual lid P, to permit the compartment to be filled with water. If desired, however, the lid P may be tightly secured and the water may be introduced from the hydrant by a hose M as in the construction shown in Figs. 1, 2 and 3.

The filter is divided by the plates B, E into three compartments C, F, I of which the middle compartment F is filled with tightly packed filtering material. The water is introduced into the upper compartment C and flows thence through the perforated tubes D into the middle compartment where it is forced through the filtering material. It will be observed that the tubes D are embedded in the body of the filtering material so that the water which emerges from them is forced directly into the compact body of the filtrant.

When the filter is connected with a tap as in the construction shown in Figs. 1, 2 and 3, the water is under considerable pressure and as it emerges from the contracted orifices or slits of the tubes D in a fine stream or jet under high pressure it is forced into and through the body of material G. Owing to the pressure thus given to the water the filtrant G may be very tightly compressed into an approximately hard mass, so that a more efficient filtration is obtained. With the construction shown the filter may be easily taken apart for purposes of repairing or cleaning.

While I prefer the minor details of construction shown, I do not limit myself to them as it is apparent that they may be varied without departing from the invention.

What I claim as new, and desire to secure by Letters Patent, is—

1. A filter composed of the hollow case having a closed top provided with an inlet for water under pressure, a closed diaphragm within the case below the top provided with one or more perforated tubes opening through the diaphragm and extending down a distance within the case below the diaphragm, a filtrant of fibrous material closely packed about the said tube or tubes, a movable perforated plate located below the diaphragm and supporting the fibrous filtrant, a cap provided with an outlet carried by the hollow case and forming the base of the filter, and means carried by said cap to adjust the movable plate and compress the fibrous filtrant about the perforated tube or tubes, whereby the water issuing from the perforations of the tubes in the form of small jets under high pressure will cut its way into the body of closely packed filtering material.

2. A filter composed of the hollow case A provided with the inlet L and hose M, the detachable cap H provided with an outlet and adapted for attachment to the base of the case A, the diaphragm B and perforated plate E within the case A forming the compartments C, F, and I, a perforated pipe or pipes leading from the compartment C to the compartment F, and a filtrant located in the compartment F between the diaphragm B and plate E and closely packed about the pipe therein.

3. A filter composed of the hollow case A provided with an inlet, the cap H provided with an outlet and adapted for attachment to the base of the case A, the diaphragm B and movable perforated plate E within the case A forming the compartments C, F, and I, a perforated pipe or pipes leading from the compartment C to the compartment F, a filtrant located in the compartment F between the diaphragm B and plate E and closely packed about the pipe therein, and means to adjust the plate E to force it upon the filtrant and compress it about the pipes.

4. A filter composed of the hollow case A provided with the inlet, the cap H provided with an outlet adapted for attachment to the base of the case A, the diaphragm B and movable perforated plate E within the case A forming the compartments C, F, and I, a perforated pipe or pipes leading from the compartment C to the compartment F, a filtrant located in the compartment F between the diaphragm B and plate E and closely packed about the pipes therein, and the adjusting screw J carried by the cap H and bearing upon the plate E.

5. A filter composed of a hollow case A provided with an inlet, an internal diaphragm B forming the upper compartment C and having one or more openings for the passage of water and the lower movable perforated plate E having the central protuberance $a$ upon its upper face.

6. A filter composed of a hollow case A provided with an inlet, an internal diaphragm B forming the upper compartment C and having one or more openings for the passage of water the perforated tubes D carried by the diaphragm B, and the lower movable perforated plate E having the central protuberance $a$ upon its upper face.

7. A filter composed of a hollow case provided with an internal stationary diaphragm, a perforated tube leading from said stationary diaphragm, a movable perforated diaphragm located below the perforated tube having a protuberance upon its upper face, whereby when the diaphragm is moved toward the upper stationary diaphgram intermediate filtering material may be compressed and forced by the protuberance upon the movable diaphragm tightly against the perforated tube.

In testimony of which invention I have hereunto set my hand.

WILLIAM LOREY.

Witnesses:
ERNEST HOWARD HUNTER,
H. L. MOTHERWELL.